United States Patent [19]

Baumann

[11] 4,278,234
[45] Jul. 14, 1981

[54] MINUTE FLOW REGULATING VALVE

[76] Inventor: Hans D. Baumann, 35 Mirona Rd., Portsmouth, N.H. 03801

[21] Appl. No.: 146,630

[22] Filed: May 5, 1980

[51] Int. Cl.³ .................................................. F16K 31/12
[52] U.S. Cl. .................................. 251/57; 236/99 R; 251/121; 251/205; 138/43; 138/46
[58] Field of Search ..................... 137/508, 510, 469; 138/43, 46; 251/57, 62, 77, 118, 205, 121; 236/99 R

[56] References Cited

U.S. PATENT DOCUMENTS

| | | | |
|---|---|---|---|
| 2,540,056 | 1/1951 | Robinson | 251/205 |
| 2,908,290 | 10/1959 | hamilton-Peters et al. | 251/57 |
| 2,956,771 | 10/1960 | Shields | 251/205 |
| 2,966,170 | 12/1960 | Raulins | 251/205 |
| 3,008,684 | 11/1961 | Frame | 251/57 |
| 3,113,756 | 12/1963 | Griffo | 251/57 |
| 3,144,879 | 8/1964 | Baumann | 251/205 |
| 3,234,960 | 2/1966 | Brumm et al. | 251/118 |
| 3,460,576 | 8/1969 | Allen | 251/205 |
| 4,204,561 | 5/1980 | Ludwig | 137/510 |

Primary Examiner—Martin P. Schwadron
Assistant Examiner—G. L. Walton

[57] ABSTRACT

A regulating valve capable of precisely controlling minute amounts of gaseous or liquid fluids following an electronic, pneumatic or manual command wherein the fluid is throttled between a pair of flat, parallel plates positioned in respect to each other through the use of hydraulic means.

3 Claims, 3 Drawing Figures

MINUTE FLOW REGULATING VALVE

BACKGROUND OF THE INVENTION

This invention is the further improvement of and based on my Adjustable Laminar Flow Restriction, U.S. Pat. No. 3,144,879 issued Aug. 18, 1964. More specifically, it is an adaptation of the Laminar Flow Restriction principal for use as automatically operated small flow control valves, as required by the process control industry and particularly by reduced scale pilot plants or laboratories.

This invention relates to a device capable of restricting the flow of liquid or gaseous media by producing a laminar flow pattern, where the potential energy of the passing fluid is gradually reduced through viscous shear friction along a very narrow opening. The efficiency of such a device depends on the ability to offer as much wetted surface to the passing fluid as possible without necessitating an increase in flow area. This can be better understood by comparing my invention with a piece of tubing. The hydraulic diameter governing the Reynolds number and consequently the amount of fluid friction created in a typical restriction may be written as $$d = 4A/U$$

where A is the flow area and U is the length of wetted surface surrounding the flow area in question. Then for a simple tube or orifice with $A = 0.785$ the hydraulic diameter $d = 1$. Assuming the identical flow area of $A = 0.785$ and 1 as diameter of the inner flow cavity in my invention, d is then calculated to be 0.5 or only half of that of a simple orifice by providing two wetted surfaces instead of one.

Further decrease in d can be obtained by selection of a large internal diameter to flow area ratio which is not possible in orifices. Fine tapered needle valves have been used to provide laminar flow restrictions in the past, where the fluid is forced to pass between the outer wall of a tapered needle and the inner wall of a tapered orifice. However, it has been found that these valves tend to drift, that is, change their effective hydraulic diameter after some time which necessitates quite frequent recalibration. The mechanism of this drift is not completely understood but may be the result of some very minute changes in the plug position due to temperature effects or inherent mechanical stresses. It has been observed that very minute side movements of the plug will effectively change the hydraulic diameter of the valve and therefore its specific fluid resistance.

In my invention, which approaches a solid state device, any movement after initial adjustment is effectively prevented and in addition, any side movement similar to the one of a valve plug would have no effect on the hydraulic diameter as will become apparent from the following detailed description. Extensive tests showed, even after months of service, no need for recalibration of my invention, even with flow rates as low as 5 cc. per minute gas flow.

Use of two parallel surfaces as described in my previous U.S. Pat. No. 3,144,879 does indeed solve the problem of not only providing an exact and reproducible flow passage but also one that provides an extremely wide "Rangeability", i.e. the useful ratio of maximum to minimum mass flow range due to the following mathematical relationship.

If one would designate the distance between the two surfaces controlling the amount of fluid resistance as H, and the radial distance the fluid has to travel through as L, then the differential pressure necessary to pass a given mass flow M is $$\Delta p = kMLv/H^3$$

wherein $v$ is the kinematic viscosity of the fluid and k is a dimensional constant. Thus adjusting H will change either the mass flow or the differential pressure by the third power ensuring a very wide rangeability for this device.

The above equation illustrates a dependency of mass flow to H to the third power assuming a consistant pressure drop across the valve. With a typical H or gap variation between two controlling surfaces from 0.0001" to 0.01", the controlled range of mass flow is equal to $1:100^3 = 1:10^6$ which indeed was proved to be correct through flow tests conducted on a preferred embodiment of my invention.

As can be appreciated, the task of adjusting the gap between the two controlling plate surfaces is of critical importance. Manual adjustment was solved in my previous (referenced) invention by utilizing the digressive motion of two slightly different pitched screw threads located on a common adjusting screw. This solution works fine, where manual adjustment is sufficient, but is not suitable if adjustment should be the consequence of a variation of an electronic or, preferably, pneumatic signal change from a process controlling instrument.

The present invention has overcome the problem of automatically and of minute adjustments of the controlling gap between two throttling surfaces by utilization of hydraulic amplifying means which, when interspaced between conventional linear motion type pneumatic or hydraulic actuators not only reduce motion of these actuators to the small fraction required, but in the process also amplify the force output of those conventional actuators by typically 10 to 20 times thereby effecting closure of said plates against hydrostatic pressure levels exceeding 3000 psi.

Other noteworthy objections of my invention include the provision of packless valve construction, that is, contrary to needle valves, no seals are in sliding contact with the outside means of adjustment commonly referred to as valve stem. Seals in my invention can be static types and therefore are not subject to wear regardless of the frequency of adjustment. Again in contrast to needle valves, the threaded means of adjustment may be of a special wear resisting material which does not have to be corrosion resistant and may be lubricated since it is not in contact with the fluid passing and being controlled.

Yet, still another object of my invention is the provision of a laminar flow restriction, which is rugged for long service life and which is easy and inexpensive to manufacture and which does not require matching of parts, hand honing and other special production methods heretofore required by present devices performing similar functions.

These and other objections and advantages of my invention will best be understood from the following detailed description, when considered in conjunction with the annexed drawings.

DESCRIPTION

Figure 1:
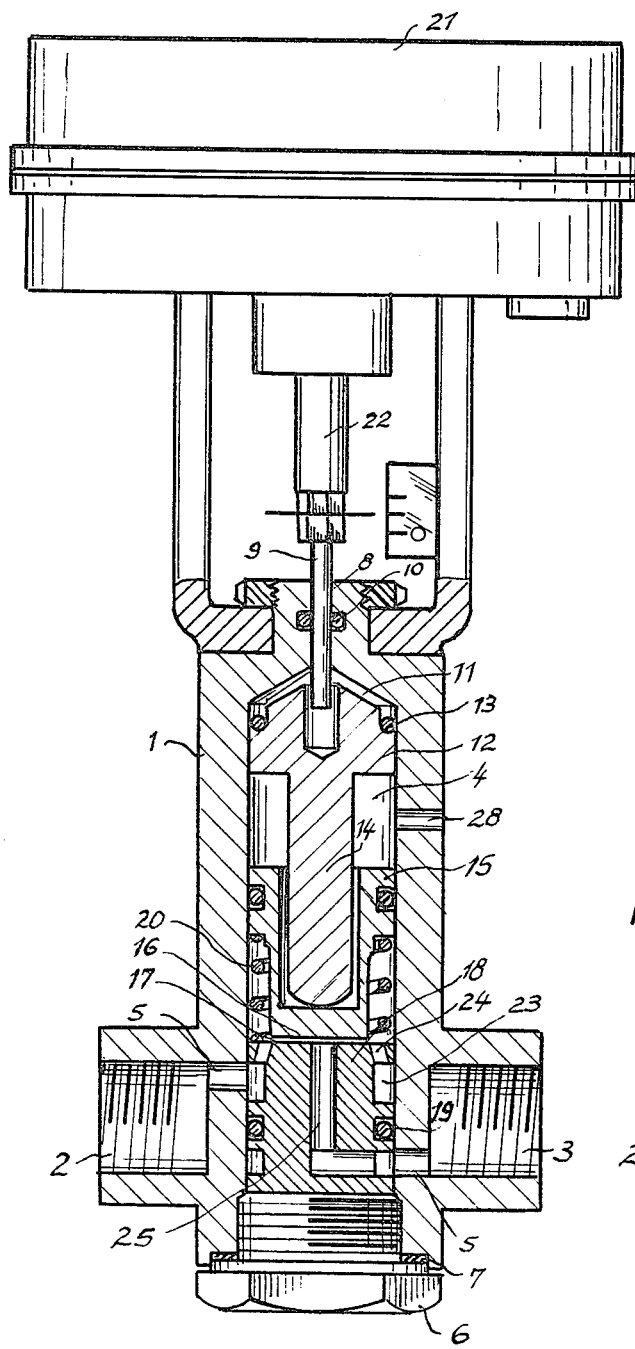
FIG. 1 is a vertical, central, cross-sectional view, showing the preferred structure and arrangement of parts of my invention suitable for higher temperature service.

The subject invention comprises a metal housing 1 having one inlet port 2 and one outlet port 3 respectively. Housing 1 furthermore has a central longitudinal bore 4 connected to said inlet and outlet ports by fluid egress passages 5. The lower terminating end of bore 4 is sealed by means of a threaded closure cap 6 and a gasket 7. An additional port opening 8 is located at the upper terminating end of longitudinal bore 4 and slidingly engages a plunger 9 which extends externally from housing 1 and which is sealed by suitable means preferably, an o-ring 10, to prevent hydraulic fluid contained in a chamber 11 from leaking past plunger 9.

Chamber 11 is formed between the upper wall of bore 4 and a piston 12 or 12a slidingly engaged in bore 4. Piston 12 is sealed at its circumference by a piston ring or o-ring 13 and has an extension rod 14 whose lower tip exerts a force onto a sliding member 15 whose lower terminating end has a precision lapped flat surface 16 which engages an equally flat surface 17, part of a separate anvil 18. The latter is securely supported by closure cap 6. Both anvil 18 and sliding member 15 have suitable fluid seals 19 at their respective peripheries. Anvil 18 and sliding member 15 are encouraged to separate by a coiled compression spring 20. A conventional pneumatic or electric actuating device 21 is mounted in the usual manner on top of valve housing 1 and is selected to exert a downward force, following the command of a pneumatic or electrical signal, by means of an actuator stem 22, onto plunger 9.

My invention will operate in the following manner: Fluid to be controlled enters port 2, being part of a piping system, passage 5 and groove 23 in anvil 18. From there it is allowed to flow upwards through a series of small passages 24 to the outer periphery of a narrow gap formed between flat surfaces 16 and 17. The fluid then has to enter and pass this gap, thereby losing potential energy (pressure) due to friction. Finally, the fluid is able to escape through a central bore 25, passage 5 and outlet port 3.

The amount of fluid flow or pressure reduction is determined by the width of the gap between flat surfaces 16 and 17 which in turn is controlled by hydraulic means. The latter consists of plunger 9 positioned through actuator stem 22 into cavity 11, which is filled with a suitable hydraulic fluid such as oil. Any additional penetration of plunger 9 into cavity 11 will displace hydraulic fluid which in turn causes a downward move of piston 12 (or 12a) after overcoming the resistance of the spring 20. This then effectively narrows the gap 17-16 and increases fluid resistance. On the other hand, retraction of plunger 9 will cause a corresponding increase in gap width and therefor a decrease in fluid resistance.

The typical maximum width of the gap between surfaces 16 and 17 is 0.015". This, combined with a typical radial distance of fluid travel of 0.250" makes the fluid mechanically important L/d ratio at least 34:1 which will keep most fluid conditions in the Laminar regime which in turn will vary the fluid resistance, or amount of fluid being passed under constant pressure drop, to the third power of the gap width "H", as discussed previously. This assures an outstandingly wide range between maximum and minimum controlled flow which far exceeds the capabilities of conventional throttling valves.

Figure 2:
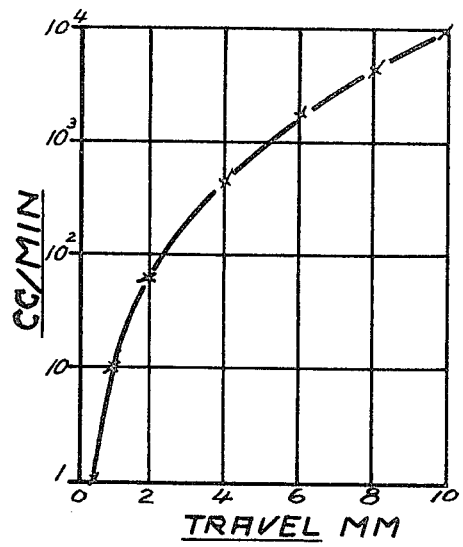
FIG. 2 is a graphical representation of the typical cubical flow characteristic, i.e. relationship between flow and stem travel, of my invention.

For example, a typical embodiment of my invention can vary the amount of gas flow from less than 1 cc/min. at 100 psi pressure drop to more than 10,000 cc/min. as shown in a graph of test measurements depicted in FIG. 2. In contrast, conventional needle type valves heretofore used, seldom exceed a flow range of 50:1!

An added benefit from the hydraulic positioning means, employed in my invention, is the benefit of force amplification. A typical embodiment of my invention will have a piston 12 diameter of 1" and a plunger 9 diameter of 3/16". Under the assumption that actuator 21 can produce a force of 100 lbs., a hydraulic fluid pressure of $100/0.187^2 \times 3.14/4 = 3621$ psi can be exerted within chamber 11, thereby allowing piston 12 (or 12a) to overcome equally high pressure levels of process fluid passing the gap between surfaces 16 and 17.

Figure 3:
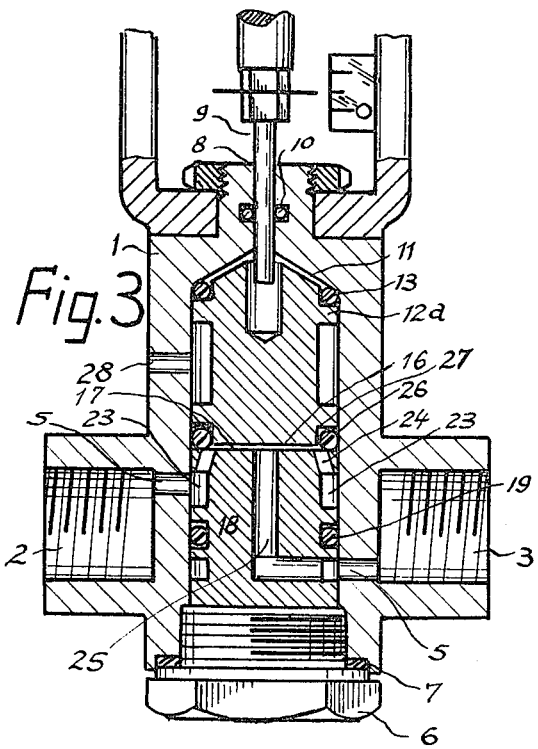
FIG. 3 is a vertical, central, cross-sectional view, showing a somewhat simplified version of the structure depicted in FIG. 1.

FIG. 3 shows an alternate mode of construction. Here piston 12 serves directly as means to control the effective gap towards anvil 18. A further simplification is the replacement of spring 20 by an o-ring or seal ring 26 as taught in my previous U.S. Pat. No. 3,144,879. Seal 26, partially recessed within groove 27 of piston 12a, serves both as elastic means to separate piston 12a from anvil 18 and as sealing means for the process fluid to be controlled and passing passages 24. A suitable vent port 28 in housing 1 keeps the area behind seals 13 and 26 nonpressurized.

The disadvantage of the design of FIG. 3 is the close proximity of the hydraulic fluid in chamber 11 in respect to the process fluid. Any temperature change in the process fluid will in turn vary the temperature of the hydraulic oil, causing thermal expansion and movement of piston 12a independently of actuator 21. Placement of an extension rod 14 as taught in FIG. 1 diminishes this temperature error. Additional compensation can be achieved by selecting the material of extension rod 14 having a different coefficient of thermal expansion to that of housing 1.

While the preferred embodiment of my invention has been designed to operate primarily in the Laminar flow regime (i.e. at Reynolds numbers generally below 2,000) it should be understood, that partial turbulence may exist around entrance and exit ports and may even commence between the plate surfaces themselves given high enough fluid velocities. It is also quite obvious to replace hydraulic fluid seals with metal bellows to prevent an even so slight leak or evaporation of hydraulic fluid. This, however, is a purely economic preference and should not be construcéted to be a limitation to any of my claims.

It should also be understood, that replacement of the pneumatic or electrical actuator 21 with a suitable handwheel arrangement will render my invention capable of manual adjustment and thereby expand the range of its useful applications without departure from the scope of the following claims.

Having thus clearly shown and described the invention, what is claimed as new and desired to secure by Letter Patent is:

1. Apparatus for controllably restricting the flow of fluid therethrough which comprises:
   (a) a housing having inlet and outlet ports, a longitudinal bore having a terminating end wall portion and at least one additional port opening connecting externally with said longitudinal bore;
   (b) means for creating a frictional flow path located within said longitudinal bore having opposed parallel and engaging flat surfaces having outer peripheries spaced interior of said longitudinal bore, and consisting of a pair of piston type elements, one of said piston type elements being fixed and the other of said piston type elements being slidable within the longitudinal bore for engaging said longitudinal housing bore and where at least one of these piston like elements has sealing means disposed at its outer cylindrical periphery, said sealing means being slidingly engaged within said bore, the space between the sliding piston type element and the terminating end wall portion retains hydraulic fluid therein;
   (c) a deformable element interspaced between said means for creating a frictional flow path;
   (d) a central bore penetrating at least one of the flat surfaces of said means to provide fluid access to either the inlet or the outlet port of said housing;
   (e) means for conducting fluid from either the inlet port or the outlet port to the outer periphery of said flat surfaces;
   (f) hydraulic means to effectively position at least one of said slidingly engaged means for creating a frictional flow path within said longitudinal bore in respect to its opposite member, said hydraulic means includes an external actuating device having a stem-like extension penetrating slidably into said hydraulic fluid filled space to allow volumetric displacement of the hydraulic fluid to in turn oppose the force of the deformable element to affect the distance between the opposed parallel and engaging flat surfaces, wherein the cross-sectional area of said stem-like extension is significantly smaller than the cross-sectional area of said sliding piston type element.

2. Apparatus of claim 1, wherein said piston like structure incorporates sliding fluid seals at its outer periphery and a central stem like extension in contact with the slidingly engaged means for creating a frictional flow path.

3. Apparatus of claim 2, wherein said stem like extension is constructed from a material having a thermal expansion coefficient substantially different from that of the housing material.

* * * * *